United States Patent
Weber et al.

[11] 3,890,305
[45] June 17, 1975

[54] DIVINYLDIPHENYL COMPOUNDS

[75] Inventors: Kurt Weber; Hans Schlapfer, both of Basel, Switzerland

[73] Assignee: Ciba-Geigy AG, Basel, Switzerland

[22] Filed: Dec. 18, 1972

[21] Appl. No.: 316,155

[30] Foreign Application Priority Data
Dec. 30, 1971 Switzerland............... 19172/71

[52] U.S. Cl.............. 260/240 D; 8/64; 8/115.6; 8/172; 106/137; 106/148; 106/176; 117/33.5 R; 117/33.5 T; 117/139.4; 117/139.5 R; 117/139.5 CQ; 162/162; 252/89; 252/301.2 W; 252/543; 260/37 EP; 260/37 N; 260/37 NP; 260/37 P; 260/308 A; 260/566 A
[51] Int. Cl............................................ C07d 55/02
[58] Field of Search ............... 260/240 D, 240 CA

[56] References Cited
UNITED STATES PATENTS

| | | | |
|---|---|---|---|
| 3,679,669 | 7/1972 | Maeder et al............... | 260/240 D |
| 3,689,481 | 9/1972 | Scheurmann et al. ....... | 260/240 CA |
| 3,725,395 | 4/1973 | Siegrist et al............. | 260/240 CA |
| 3,732,213 | 5/1973 | Balzer et al. ............. | 260/240 CA |

FOREIGN PATENTS OR APPLICATIONS

| | | | |
|---|---|---|---|
| 2,025,792 | 12/1970 | Germany ................. | 260/240 D |

*Primary Examiner*—John D. Randolph
*Attorney, Agent, or Firm*—Joseph G. Kolodny; Edward McC. Roberts; Michael W. Glynn

[57] ABSTRACT

New divinyldiphenyl compounds free of sulphonic acid groups, of the formula

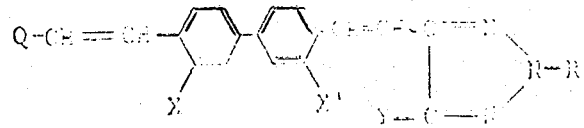

wherein
R represents an optionally substituted phenyl, naphthyl or diphenylyl radical,
Y represents hydrogen, chlorine, bromine alkyl or a phenyl, naphthyl or diphenylyl which may be substituted by non-chromophoric groups,
Q represents a phenyl, naphthyl or diphenylyl radical which may be substituted by non-chromophoric groups or a radical

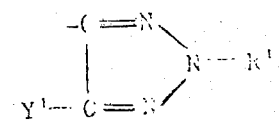

wherein
R' represents a phenyl, naphthyl or diphenylyl radical which may be substituted by non-chromophoric groups and
Y' represents hydrogen, chlorine, bromine, alkyl or a phenyl, naphthyl or diphenylyl radical which may be substituted by non-chromophoric groups,
and
X and X' independently of one another represent hydrogen, halogen, alkyl or alkoxy with 1 to 4 carbon atoms or a sulphonic acid amide or sulphonic acid ester groups;
said compounds are particularly useful as optical brighteners.

7 Claims, No Drawings

DIVINYLDIPHENYL COMPOUNDS

The present invention relates to new 4,4'-divinyldiphenyl compounds, their use for the optical brightening of organic materials and processes for their manufacture.

The new compounds which are free of sulpho groups correspond to the formula (1) 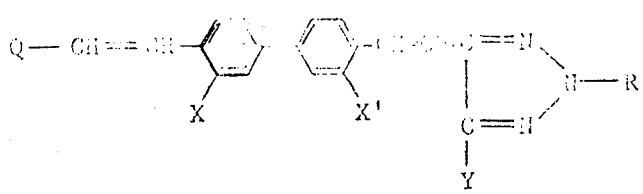

wherein R represents optionally substituted phenyl, naphthyl or diphenylyl, Y represents hydrogen, chlorine, bromine, alkyl (preferably with 1 to 6 carbon atoms) or optionally non-chromophorically substituted phenyl, naphthyl or diphenylyl, Q represents optionally non-chromophorically substituted phenyl, naphthyl or diphenylyl or a radical

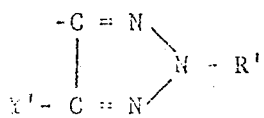

wherein R' represents optionally non-chromophorically substituted phenyl, naphthyl or diphenylyl and Y' represents hydrogen, chlorine, bromine, alkyl (preferably with 1 to 6 carbon atoms) or optionally non-chromophorically substituted phenyl, naphthyl or diphenylyl and X and X' independently of one another represent hydrogen, halogen, alkyl or alkoxy with 1 to 4 carbon atoms or a sulphonic acid amide or sulphonic acid ester group.

Possible substituents of the phenyl, naphthyl or diphenylyl radicals (in the definitions of Q, R, R', Y or Y') are above all halogen, preferably chlorine, alkyl with 1 to 4 carbon atoms, alkenyloxy with 3 or 4 carbon atoms, optionally substituted alkoxy, preferably with 1 to 12 carbon atoms, optionally substituted benzyloxy,

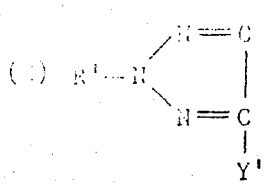

wherein $R_2$ and $R_3$ independently of one another represent hydrogen or alkyl with 1 to 4 carbon atoms or $R_2$ and $R_3$ together with the nitrogen atom represent optionally methyl-substituted piperidino or morpholino or pyrrolidino or hexamethyleneimino, —$SO_3R_4$, wherein $R_4$ represents alkyl with 1 to 4 carbon atoms or optionally substituted phenyl, the sulphone group, the nitrile group or the carboxyl group as well as its salts, esters or amides. As substituents of the alkoxy radical there should especially be mentioned halogen, hydroxyl, alkoxy with 1 to 4 carbon atoms, nitrile as well as the carboxylic acid group including its esters and amides and as substituents of the benzyloxy radical there should especially be mentioned alkyl or alkoxy with 1 to 4 carbon atoms or halogen, preferably chlorine. The number of substituents on a phenyl, naphthly or diphenylyl radical in general does not exceed 2. Amongst the series phenyl, naphthyl and diphenylyl, phenyl is preferred.

If X or X' represents a sulphonamide or sulphonic acid ester group, this group preferably corresponds to the partial formulae

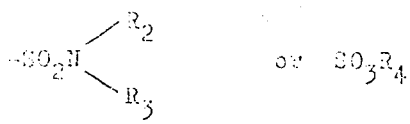

wherein $R_2$, $R_3$ and $R_4$ have the abovementioned meaning.

Within the framework of the formula (1), compounds of the formula (2) 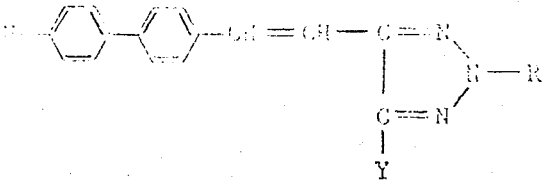

wherein R, R', Y and Y' have the abovementioned meaning, are above all of interest. In general, the total number of the diphenylyl and/or naphthyl radicals (in the meaning of R, Y and Q or R, R', Y and Y') in the compounds according to the formula (1) and (2) does not exceed the numbers 2.

Compounds to be singled out are those of the formula (3) 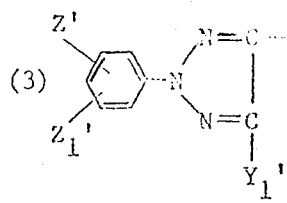 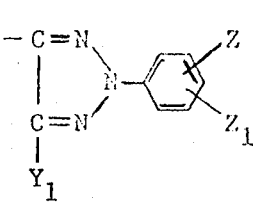

wherein $Y_1$ and $Y_1'$ independently of one another denote hydrogen, chlorine, alkyl with 1 to 6 carbon atoms or phenyl, naphthyl or diphenylyl optionally substituted by chlorine, alkyl with 1 to 4 carbon atoms or alkoxy with 1 to 4 carbon atoms, Z and Z' independently of one another denote hydrogen, fluorine, chlorine, bromine, alkyl with 1 to 4 carbon atoms, optionally substituted alkoxy with 1 to 12 carbon atoms, alkenyloxy with 3 or 4 carbon atoms or benzyloxy and $Z_1$ and $Z_1'$ independently of one another denote hydrogen, fluroine, chlorine, bromine, alkyl with 1 to 4 carbon atoms or alkoxy with 1 to 4 carbon atoms.

Within the framework of the formulae (2) and (3), symmetrically substituted compounds are in each case preferred (R = R', Y = Y' or Z = Z', $Z_1 = Z_1'$, $Y_1 = Y_1'$).

Such symmetrical types are, for example, those of the formula (4) 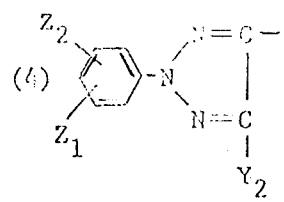

wherein $Z_1$ has the abovementioned meaning, $Z_2$ denotes hydrogen, fluorine, chlorine, bromine, alkyl with 1 to 4 carbon atoms or alkoxy with 1 to 4 carbon atoms and $Y_2$ denotes hydrogen or methyl.

Compounds of particular practical interest are those of the formula (5) 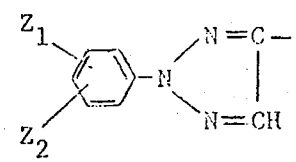

wherein $Z_1$ and $Z_2$ have the indicated meaning and (6) 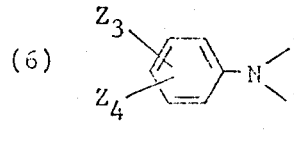

wherein $Z_3$ denotes hydrogen, chlorine, bromine, methyl, ethyl or methoxy, $Z_4$ denotes hydrogen, bromine or methyl and $Y_2$ denotes hydrogen or methyl.

The compounds of the formula (1) or of subordinate formulae can be manufactured analogously to processes which are in themselves known.

In general, the procedure followed is to react about 1 mol equivalent of a compound of the formula (7) 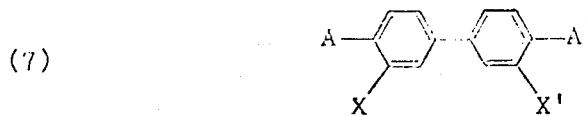

with about 1 mol equivalent of a compound of the formula (8a)

Q—A₁ and about 1 mol equivalent of a compound of the formula (8b) 

wherein X, X', Q, Y and R have the abovementioned meaning and of the symbols A and $A_1$ denotes a

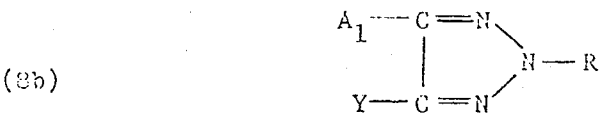

group and the other denotes a grouping of the formula

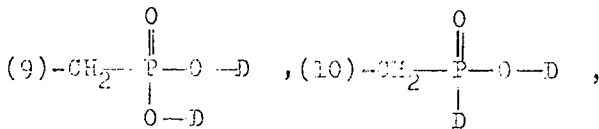

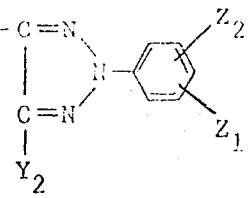

wherein D represents an alkyl radical, preferably with up to 6 carbon atoms, which is optionally substituted further, an aryl radical, preferably a phenyl radical, a cycloalkyl radical, preferably a cyclohexyl radical or an aralkyl radical, preferably a benzyl radical.

Accordingly, for example, dialdehydes of the formula

(13) 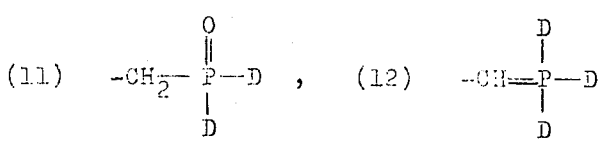

can be reacted with monofunctional compounds of the formula (14)

Q—U or

(14) Q—V or (15) 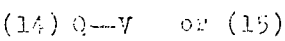 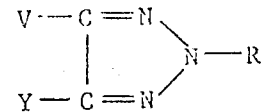

or monoaldehydes of the formula

(16) Q—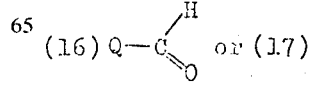 or (17) 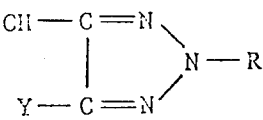

can be reacted with bifunctional compounds of the formula

(18) 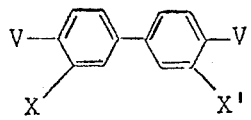

wherein X, X', Q, Y and R have the indicated meaning and V denotes a substituent, containing phosphorus, of the formulae (9), (10), (11) or (12).

The phosphorus compounds of the formulae (14), (15) and (18) which are herein required as starting substances or obtained in a manner which is in itself known by reacting halogenomethyl compounds, preferably chloromethyl or bromomethyl compounds of the formula

(19)  Q—CH$_2$—Halogen     (20) 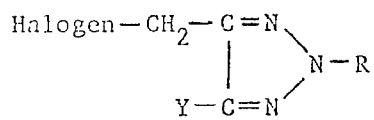

(21) 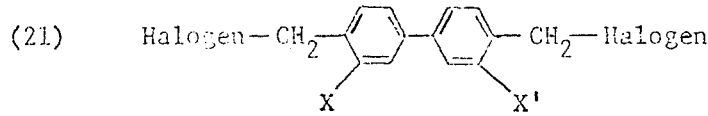

with phosphorus compounds of the formulae

(22) 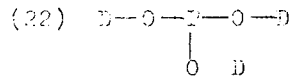     (23) 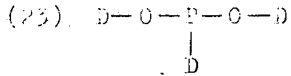

(24) 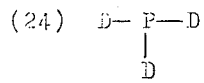  or  (25) 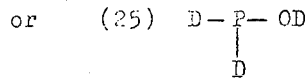

In these formulae, D has the indicated meaning, with radicals D bonded to oxygen preferably being a lower alkyl group whilst radicals D bonded directly to phosphorus are preferably aryl radicals such as benzene radicals. The phosphorus compound of the formula (11) can also be obtained by reaction of halogenomethyl compounds, preferably chloromethyl or bromomethyl compounds, of the formulae (19), (20) or (21) with p-chlorodiphenylphosphine and subsequent reaction with an alcohol of the formula D—OH (meaning of D as defined above), for example with methanol or with water.

A variant of particular practical importance consists of using, as the diphenyl components according to the formula (7) those which correspond to the formula

(26) 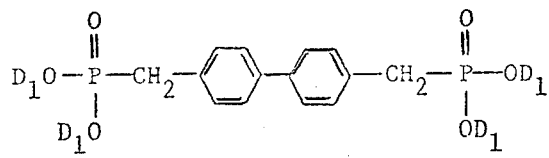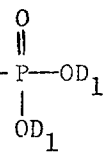

wherein D$_1$ denotes an alkyl group with 1 to 6 carbon atoms.

The manufacturing process is advantageously carried out in inert solvents. As examples thereof there may be mentioned hydrocarbons such as toluene and xylene or alcohols such as methanol, ethanol, isopropanol, butanol, glycols, glycol-ethers such as 2-methoxyethanol, hexanols, cyclohexanol and cyclooctanol, and also ethers such as diisopropyl ether, tetrahydrofurane and dioxane, as well as dimethylsulphoxide, formamide and N-methylpyrrolidone. Polar organic solvents such as dimethylformamide and dimethylsulphoxide are particularly suitable. Some of the reactions can also be carried out in aqueous solution.

The temperature at which the reaction is carried out can vary within wide limits. It is determined ($\alpha$) by the stability of the solvents used towards the reactants, especially towards the strongly basic alkali metal compounds, ($\beta$) by the reactivity of the condensation partners and ($\gamma$) by the activity of the combination of solvent-base as the condensation agent.

Accordingly, in practice temperatures between about 10° and 100°C are in general used, especially if dimethylformamide or dimethylsulphoxide are used as solvents. The preferred temperature range is about 20° to 60°C. However, under certain circumstances higher temperatures can also be used if this is desired for reasons of saving time or a less active but cheaper condensation agent is to be employed: Fundamentally, reaction temperatures in the range of 10° to 180°C are thus also possible.

As strongly basic alkali metal compounds, the hydroxides, amides and alcoholates (preferably those of primary alcohols containing 1 to 4 carbon atoms) of the alkali metals are above all used, and for economic reasons those of lithium, sodium and potassium are of predominant interest. However, in principle, and in special cases, it is also possible successfully to use alkali metal sulphides and alkali metal carbonates, aryl-alkali metal compounds such as, for example, phenyllithium, or strongly basic amines (including ammonium bases, for example trialkylammonium hydroxides).

Using the process described above mixtures of asymmetrically substituted compounds according to the formula (1) and the two corresponding symmetrically substituted compounds may possibly be obtained in the first instance, as a result of competing reaction of the three reactants. These components can be separated on the basis of their different solubility behaviour.

Within the framework of the present invention it is also possible without difficulty — depending on the special technological requirements — to employ the new compounds described, mixed with the corresponding compounds of symmetrical structure obtainable from the competing reaction of the manufacturing process, for the purpose of optical brightening. This means that in practical application it is also possible — depending on the end use — to dispense with a separation of the competing reaction products.

A further process consists of reacting a compound of the formula

(27) 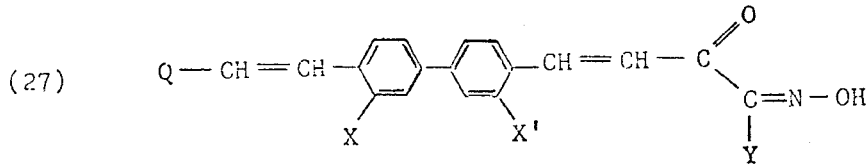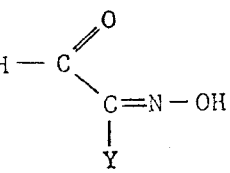

with a hydrazine of the formula
(28)

$$H_2N-NH-R$$

and cyclizing the resulting oxime-hydrazone of the formula

(29) 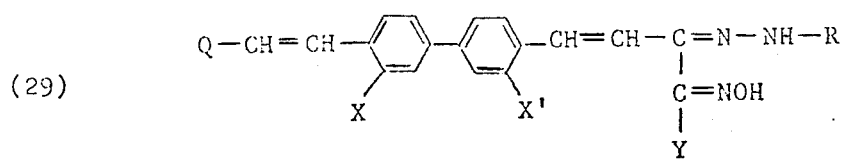

to give the compound of the formula (1).

Symmetrical compounds are obtained analogously by reaction of 1 mol of a compound of the formula

(30) 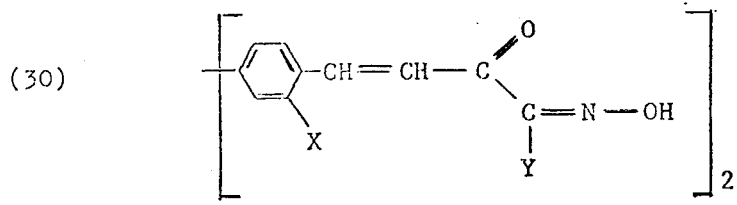

with 2 mols of a hydrazine of the formula (28) and cyclization of the oxime-hydrazone obtained thereby, of the formula

(31) 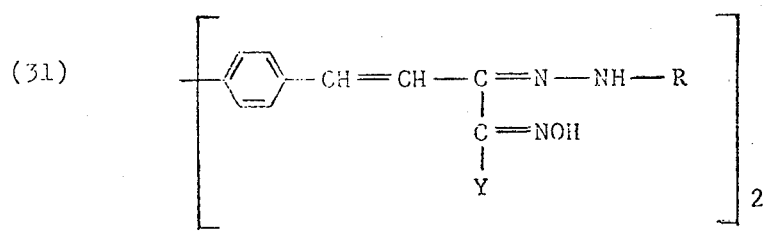

The reaction of a compound of the formula (27) or (30) with a compound of the formula (28) is in general carried out in an organic solvent which is inert towards the reactants, for example optionally halogenated aliphatic or aromatic hydrocarbons, alcohols, ethers, glycols, formamide, dimethylformamide, acetonitrile and the like, or in a low molecular alkanecarboxylic acid, such as acetic acid or propionic acid, at a temperature of 10° to 100° C, preferably 30° to 70° C. The cyclization of the isolated oxime-hydrazone of the formula (29) or (31) to give the compound of the formula (1) is appropriately effected by means of agents which split off water, for example anhydrides or halides of alkanecarboxylic acids, such as acetic anhydride or propionic acid chloride or phosporus halides, such as phosphorus trichloride or phosphorus pentachloride. For this, a temperature range of 10° to 160° C, preferably of 30° to 120° C is in general used. When employing acid halides the reaction can be carried out in an organic solvent which is inert towards the oxime-hydrazone and the acid halide, such as optionally halogenated hydrocarbons, ethers, dimethylformamide and the like. If an anhydride is employed as the agent for splitting off acid, the reaction can be allowed to take place in an excess thereof, optionally in the presence of a further solvent. The cyclization to give the triazole of the formula (1) can also be effected by heating with urea to temperatures of 100° to 210° C, preferably 120° C, in which case, in general, a 2-fold to 20-fold amount of urea, relative to the dry weight of the oxime-hydrazone, is employed.

The new compounds defined above are colorless to, at most, slightly colored and show a more or less pronounced fluorescence in the dissolved or finely divided state. They can be used for the optical brightening of the most diverse synthetic, semi-synthetic or natural organic materials or substances which contain such organic materials.

The following groups of organic materials, where optical brightening thereof is relevant, may be mentioned as examples of the above, without the survey given below being intended to express any restriction thereto:

I. Synthetic organic high molecular materials:

a. Polymerization products based on organic compounds containing at least one polymerizable carbon-carbon double bond, that is to say their homopolymers or copolymers as well as their after-treatment products such as, for example, cross-linking, grafting or degradation products, polymer blends, or products obtained by modification of reactive groups, for example polymers based on α, β-unsaturated carboxylic acids or derivatives of such carboxylic acids, especially on acrylic compounds (such as, for example, acrylic esters, acrylic acid, acrylonitrile, acrylamides and their derivatives or their methacryl analogues), of olefine hydrocarbons (such as, for example, ethylene, propylene, styrenes or dienes and also so-called ABS polymers), and polymers based on vinyl and vinylidene compounds (such as, for example, vinyl chloride, vinyl alcohol and vinylidene chloride), b. Polymerization products such as are, for example, obtainable by ring opening, for example, polyamides of the polycaprolactam type, and also polymers which are obtainable both via polyaddition and via polycondensation, such as polyethers or polyacetals, c. Polycondensation products or precondensates based on bifunctional or polyfunctional compounds possessing condensable groups, their homocondensation and co-condensation products, and after-treatment products, such as, for example, polyesters, especially saturated (for example ethylene glycol terephthalic acid polyester) or unsaturated (for example maleic acid-dialcohol polycondensates as well as their crosslinking products with copolymerizable vinyl monomers), unbranched and branched (also including those based on polyhydric alcohols, such as, for example alkyd resins) polyesters, polyamides (for example hexamethylenediamine adipate), maleate resins, melamine resins, their precondensates and analogues, polycarbonates and silicones, d. Polyaddition products such as polyurethanes (cross-linked and non-crosslinked) and epoxide resins.

II. Semi-synthetic organic materials such as, for example, cellulose esters of varying degrees of esterification (so-called 2½ acetate or triacetate) or cellulose ethers, regenerated cellulose (viscose or cuprammonium cellulose), or their after-treatment products, and casein plastics.

III. Natural organic materials of animal or vegetable origin, for example based on cellulose or protein, such as cotton, wool, linen, silk, natural lacquer resins, starch and casein.

The organic materials to be optically brightened can be in the most diverse states of processing (raw materials, semi-finished goods or finished goods). On the other hand, they can be in the form of structures of the most diverse shapes, that is to say, for example, predominantly three-dimensional bodies such as sheets, profiles, injection mouldings, various machined articles, chips, granules or foams, and also as predominantly two-dimensional bodies such as films, foils, lacquers, coverings, impregnations and coatings, or as predominantly one-dimensional bodies such as filaments, fibres, flocks and wires. The said materials can, on the other hand, also be in an unshaped state, in the most diverse homogeneous or inhomogeneous forms of division, such as, for example, in the form of powders, solutions, emulsions, dispersions, latices, pastes or waxes.

Fibre materials can, for example, be in the form of endless filaments (stretched or unstretched), staple fibres, flocks, hanks, textile filaments, yarns, threads, fibre fleeces, felts, waddings, flock structures or woven textile fabrics, textile laminates, knitted fabrics and papers, cardboards or paper compositions.

The compounds to be used according to the invention are of importance, inter alia, for the treatment of organic textile materials, especially woven textile fabrics. Where fibres, which can be in the form of staple fibres or endless filaments or in the form of hanks, woven fabrics, knitted fabrics, fleeces, flock substrates or laminates, are to be optically brightened according to the invention, this is advantageously effected in an aqueous medium, wherein the compounds in question are present in a finely divided form (suspensions, so-called microdispersions or possibly solutions). If desired, dispersing agents, stabilizers, wetting agents and further auxiliaries can be added during the treatment.

Depending on the type of brightener compound used, it may prove advantageous to carry out the treatment in a neutral or alkaline or acid bath. The treatment is usually carried out at temperatures of about 20° to 140°C, for example at the boiling point of the bath or near it (about 90°C). Solutions or emulsions in organic solvents can also be used for the finishing, according to the invention, of textile substrates, as is practiced in the dyeing trade in so-called solvent dyeing (pad-thermofix application, or exhaustion dyeing processes in dyeing machines).

The new optical brighteners according to the present invention can further be added to, or incorporated in, the materials before or during their shaping. Thus they can, for example, be added to the compression moulding composition or injection moulding composition during the manufacture of films, sheets (for example hot milling into polyvinyl chloride) or mouldings.

Where fully synthetic or semi-synthetic organic materials are being shaped by spinning processes or via spinning compositions, the optical brighteners can be applied in accordance with the following processes:

Addition to the starting substances (for example monomers) or intermediates (for example precondensates or prepolymers), that is to say before or during the polymerization, polycondensation or polyaddition, Powdering onto polymer chips or granules for spinning compositions, Bath dyeing of polymer chips or granules for spinning compositions, Metered addition to spinning melts or spinning solutions, and Application to the tow before stretching.

The new optical brighteners according to the present invention can, for example, also be employed in the following use forms: a. Mixed with dyestuffs (shading) or pigments (colored pigments or especially, for example, white pigments), or as an additive to dye baths, printing pastes, discharge pastes or reserve pastes, or for the after-treatment of dyeings, prints or discharged prints. b. Mixed with so-called "carriers," wetting agents, plasticizers, swelling agents, anti-oxidants, light protection agents, heat stabilisers and chemical bleaching agents (chlorite bleach or bleaching bath additives). c. Mixed with crosslinking agents or finishing agents (for example starch or synthetic finishes), and in combination with the most diverse textile finishing processes, especially synthetic resin finishes (for example creaseproof finishes such as "wash-and-wear," "permanent-press" or "no-iron"), as well as flameproof finishes, soft handle finishes, anti-soiling finishes or anti-static finishes, or antimicrobial finishes. d. Incorporation of the optical brighteners into polymeric carriers (polymerization, polycondensation or polyaddition products), in a dissolved or dispersed form, for use, for example, in coating agents, impregnating agents or binders (solutions, dispersions and emulsions) for textiles, fleeces, paper and leather. e. As additives to so-called "master batches." f. As additives to the most diverse industrial products in order to render these more marketable (for example improving the appearance of soaps, detergents, pigments). g. In combination with other optically brightening substances. h. In spinning bath preparations, that is to say as additives to spinning baths such as are used for improving the slip for the further processing of synthetic fibres, or from a special bath before the stretching of the fibre. i. As scintillators for various purposes of a photographic nature, such as, for example, for electrophotographic reproduction or supersensitisation, and for the optical brightening of photographic layers, optionally in combination with white pigments such as, for example, $TiO_2$.

If the brightening process is combined with textile treatment methods or finishing methods, the combined treatment can in many cases advantageously be carried out with the aid of appropriate stable preparations, which contain the optically brightening compounds in such concentration that the desired brightening effect is achieved.

In certain cases, the brighteners are made fully effective by an after-treatment. This can, for example, represent a chemical treatment (for example acid treatment), a thermal treatment (for example heat) or a combined chemical/thermal treatment. Thus, for example, the appropriate procedure to follow in optically brightening a series of fibre substrates, for example of polyester fibres, with the brighteners according to the invention is to impregnate these fibres with the aqueous dispersions (optionally also solutions) of the brighteners at temperatures below 75°C, for example at room temperature, and to subject them to a dry heat treatment at temperatures above 100°C, it being generally advisable additionally to dry the fibre material beforehand at a moderately elevated temperature, for example at not less than 60°C and up to about 130°C. The heat treatment in the dry state is then advantageously carried out at temperatures between 120° and 225°C, for example by heating in a drying chamber, by ironing within the specified temperature range or by treatment with dry, superheated steam. The drying and dry heat treatment can also be carried out in immediate succession or be combined in a single process stage.

The amount of the new optical brighteners to be used according to the invention, relative to the material to be optically brightened, can vary within wide limits. A distinct and durable effect is already achievable with very small amounts, in certain cases, for example, amonts of 0.0005 percent by weight. However, amounts of up to about 0.8 percent by weight and optionally of up to about 2 percent by weight can also be employed. For most practical purposes, amounts between 0.005 and 0.5 percent by weight are of preferred interest.

The new optical brightening agents are also particularly suitable for use as additives for wash liquors or industrial and domestic washing agents, to which they can be added in various ways. They are appropriately added to wash liquors in the form of their solutions in water or organic solvents or in a finely divided form, as aqueous dispersions. They are advantageously added to domestic or industrial washing agents in any stage of the manufacturing process of the washing agents, for example to the so-called "slurry" before spray-drying the washing powder, or during the preparation of liquid washing agent combinations. They can be added either in the form of a solution or dispersion in water or other solvents or, without auxiliaries, as a dry brightening powder. For example, the brightening agents can be mixed, kneaded or ground with the detergent substances and, in this form, admixed to the finished washing powder. However, they can also be sprayed in a dissolved or pre-dispersed form onto the finished washing agents.

Possible washing agents are the known mixtures of detergent substances such as, for example, soap in the form of chips and powders, synthetics, soluble salts of sulphonic acid half esters of higher fatty alcohols, arylsulphonic acids with higher and/or multiple alkyl substituents, sulphocarboxylic acid esters of medium to higher alcohols, fatty acid acylaminoalkyl- or acylaminoaryl-glycerinesulphonates, phosphoric acid esters of fatty alcohols and the like. Possible so-called "builders" which can be used are, for example, alkali metal polyphosphates and polymetaphosphates, alkali metal pyrophosphates, alkali metal salts of carboxymethylcellulose and other "soil redeposition inhibitors," and also alkali metal silicates, alkali metal carbonates, alkali metal borates, alkali metal perborates, nitrilotriacetic acid, ethylenediaminotetraacetic acid, and foam stabilizers such as alkanolamides of higher fatty acids. The washing agents can further contain for example: antistatic agents, skin protection agents which restore fat, such as lanolin, enzymes, anti-microbial agents, perfumes and dyestuffs.

The new optical brighteners have the particular advantage that they are also active in the presence of active chlorine donors such as, for example, hypochlorite, and can be used without significant loss of the effects in wash liquors containing non-ionic washing agents, for example alkylphenol polyglycol ethers.

The compounds according to the invention are added in amounts of 0.005 to 1 percent or more, relative to the weight of the liquid or pulverulent finished washing agent. Washing liquors which contain the indicated amounts of the optical brighteners claimed impart a brilliant appearance in daylight when used to wash textiles of cellulose fibres, polyamide fibres, cellulose fibres with a high quality finish, polyester fibres, wool and the like.

The washing treatment is carried out as follows, for example:

The textiles indicated are treated for 1 to 30 minutes at 20° to 100°C in a wash liquor which contains 1 to 10 g/kg of a built-up composite washing agent and 0.05 to 1 percent, relative to the weight of the washing agent, of the claimed brightening agents. The liquor ratio can be 1:3 to 1:50. After washing, the textiles are rinsed and dried in the usual manner. The wash liquor can contain 0.2 g/l of active chlorine (for example as hypochlorite) or 0.1 to 2 g/l of sodium perborate as a bleaching additive.

EXAMPLE 1

20.5 g of 4,4'-bis-(dimethoxyphosphonomethyl)-diphenyl and 18.0 g of 2-phenyl-1,2,3-triazol-4-aldehyde are dissolved in 100 ml of anhydrous dimethylformamide at 40°C whilst stirring and displacing the air by nitrogen. 7.2 g of sodium methylate (97.8% strength) are introduced in portions over the course of about 5 minutes whilst ensuring, through occasional cooling with ice water, that the temperature does not exceed 45°C. The reaction mixture is stirred for a further 4 hours at 40° to 45°C, mixed with 100 ml of desalinated water and neutralized with about 1 ml of formic acid and the product which has crystallized out is filtered off and washed with water.

After drying vacuo at 100° to 110°C the product is twice recrystallised from tetrachloroethylene and the resulting product is extracted with 400 ml of methanol at the boil. The residue is dried in vacuo at 90° to 100°C. About 5.2 g of the compound of the formula

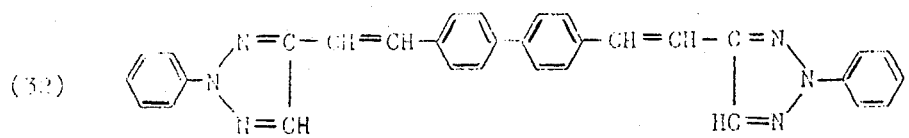

(32)

are obtained as a light yellow powder. Melting point: 260° to 261°C.

The compounds of the formula

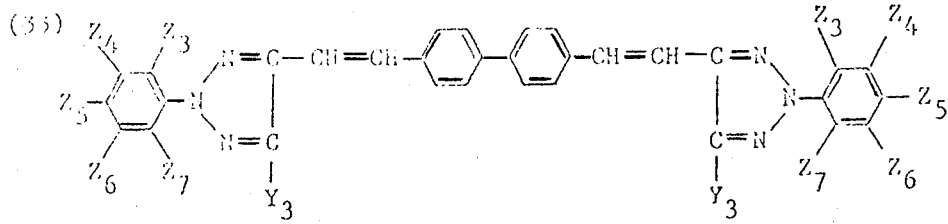

(33)

listed in Table I are manufactured analogously.

Table I

| Formula No. | $Y_3$ | $Z_3$ | $Z_1$ | $Z_5$ | $Z_6$ | $Z_7$ |
|---|---|---|---|---|---|---|
| 34 | H | H | F | H | H | H |
| 35 | H | H | H | F | H | H |
| 36 | H | H | H | H | Cl | H |
| 37 | H | H | H | Cl | H | H |
| 38 | H | H | $CH_3$ | Cl | H | H |
| 39 | H | H | Br | H | H | H |
| 40 | H | H | H | Br | H | H |
| 41 | H | H | Br | Br | H | H |
| 42 | H | $CH_3$ | H | Br | H | H |
| 43 | H | H | $CH_3$ | Br | H | H |
| 44 | $CH_3$ | H | H | H | H | H |
| 45 | H | H | $CH_3$ | H | H | H |
| 46 | H | H | H | $CH_3$ | H | H |
| 47 | H | H | $CH_3O$ | H | H | H |
| 48 | H | H | H | $C_2H_5$ | H | H |
| 49 | H | H | $CH_3$ | $CH_3$ | H | H |
| 50 | H | H | Cl | Br | H | H |
| 51 | H | $CH_3$ | H | H | $CH_3$ | H |
| 52 | $CH_3$ | H | H | Br | H | H |

EXAMPLE 2

A polyamide fibre fabric (Perlon) is introduced, using a liquor ratio of 1:40, into a bath at 60°C which contains (relative to the fabric weight) 0.1 percent of one of the brighteners of the formula (32), (36), (37) or (44) and, per liter, 1 g of 80 percent strength acetic acid and 0.25 g of an addition product of 30 to 35 mols of ethylene oxide to 1 mol of technical stearyl alcohol. The mixture is warmed to the boil over the course of 30 minutes and kept at the boil for 30 minutes. After rinsing and drying, a good brightening effect is obtained.

If instead of the polyamide-6 fabric a polyamide-66 (Nylon) fabric is used, similar brightening effects are obtained.

Finally, the process can also be carried out under high temperature conditions, for example for 30 minutes at 130°C. For this type of use, it is advisable to add 3 g/l of hydrosulphite to the liquor.

EXAMPLE 3

10,000 g of a polyamide in chip form, manufactured in a known manner from hexamethylenediamine adipate, are mixed with 30 g of titanium dioxide (rutile modification) and 5 g of one of the compounds of the formula (32), (36), (37), (38), (44), (45), (46), (47), or (49) in a tumbler vessel for 12 hours. The chips treated in this way are fused in a kettle heated to 300°–310°C with oil or diphenyl vapour after displacing the atmospheric oxygen by steam, and are stirred for half an hour. Thereafter the melt is extruded through a spinneret under a nitrogen pressure of 5 atmospheres gauge and the filament spun in this way is cooled and wound up on a spinning bobbin. The resulting filaments show a good brightening effect.

If instead of a polyamide manufactured from hexamethylenediamine adipate a polyamide manufactured from ε-caprolactam is used, similarly good results are obtained.

EXAMPLE 4

A polyester fabric (for example "Dacron") is padded at room temperature (about 20°C) with an aqueous dispersion which contains, per liter, 0.1 to 2 g of one of the compounds of the formula (32), (36), (37) or (44) and 1 g of an addition product of about 35 mols of ethylene oxide to 1 mol of octadecyl alcohol and is dried at about 100°C. The dry material is subsequently subjected to a heat treatment at about 220°C for 30 seconds. The polyester fabric treated in this way shows a strong optical brightening effect.

EXAMPLE 5

100 g of polyester granules of terephthalic acid ethylene glycol polyester are intimately mixed with 0.05 g of one of the compounds of the formula (32), (36), (37), (38), (44), (45), (46), (47) or (49) and fused at 285°C whilst stirring. After spinning through customary spinnerets, strongly brightened polyester fibres are obtained.

The optical brightener can also be added to the starting substances before or during the polycondensation to give the polyester.

EXAMPLE 6

100 parts of polystyrene and 0.1 part of one of the compounds of the formula (32), (36), (37) or (44) are fused, with exclusion of air, for 20 minutes at 210°C in a tube of 1 cm diameter.

After cooling, an optically brightened polystyrene mass of good fastness to light is obtained.

EXAMPLE 7

A 13 percent strength casting composition of acetylcellulose in acetone which contains — relative to the dry weight of plastic — 2 percent of anatase (titanium dioxide) as the matting agent and 0.04% of one of the compounds of the formula (32), (36), (37) or (44), is cast on a glass plate and spread by means of a metal rod to give a thin film. After drying, the film shows a substantially higher degree of whiteness than a film manufactured in the same way which does not contain an optical brightener.

EXAMPLE 8

7 g of anatase ($TiO_2$) followed by 350 g of polyacrylonitrile polymer (= PAC) in powder form are added to 1,400 ml of dimethylformamide; the mixture is converted by means of a high speed stirrer into a viscous mass.

5 mg of one of the compounds of the formula (32), (36) (37) or (44) are added to 50 g of this 20% strength solution of the PAC. This mixture is homogenized by stirring and is then left to stand for 1 hour in order to allow the air bubbles produced to diffuse out of it.

Thereafter the mass is cast on a glass plate and is spread by means of a metal rod to give a uniform film.

The PAC film is then dried in a drying cabinet for about 15 minutes at 50°C with ventilation (air extraction) and thereafter at room temperature with slight ventilation.

The PAC film can then easily be detached from the glass plate. It has a substantially higher degree of whiteness than a film manufactured in the same way which does not contain the optical brightener.

We claim:

1. A compound of the formula

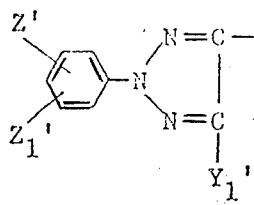
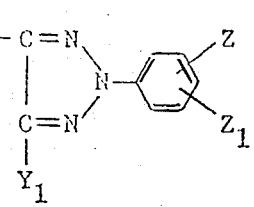

wherein $Y_1$ and $Y_1'$ independently of one another denote hydrogen, chlorine, alkyl with 1 to 6 carbon atoms or phenyl, naphthyl or diphenylyl or phenyl, naphthyl or disphenylyl substituted by chlorine, alkyl with 1 to 4 carbon atoms or alkoxy with 1 to 4 carbon atoms, $Z$ and $Z'$ independently of one another denote hydrogen, fluorine, chlorine, bromine, alkyl with 1 to 4 carbon atoms, optionally substituted alkoxy with 1 to 12 carbon atoms, alkenyloxy with 3 or 4 carbon atoms, or benzyloxy and $Z_1$ and $Z_1'$ independently of one another denote hydrogen, fluorine, chlorine, bromine, alkyl with 1 to 4 carbon atoms are alkoxy with 1 to 4 carbon atoms.

2. A compound according to claim 1, corresponding to the formula

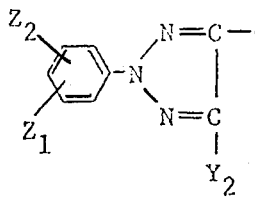
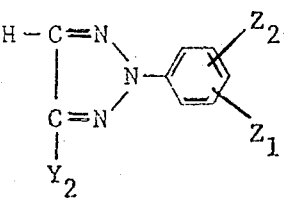

wherein $Y_2$ denotes hydrogen or methyl and $Z_1$ and $Z_2$ independently of one another denote hydrogen, fluorine, chlorine, bromine, alkyl with 1 to 4 carbon atoms or alkoxy with 1 to 4 carbon atoms.

3. A compound according to claim 1, corresponding to the formula

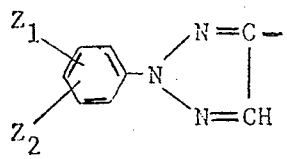

wherein $Z_1$ and $Z_2$ independently of one another denote hydrogen, fluorine, chlorine, bromine, alkyl with 1 to 4 carbon atoms or alkoxy with 1 to 4 carbon atoms.

4. A compound according to claim 1, corresponding to the formula

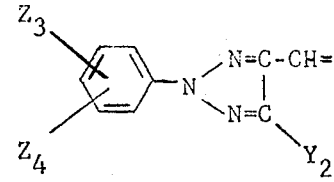
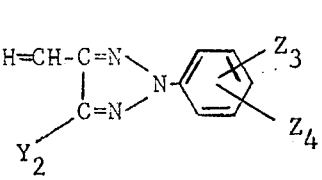

wherein $Z_3$ denotes hydrogen, chlorine, bromine, methyl, ethyl or methoxy, $Z_4$ denotes hydrogen, bromine or methyl and $Y_2$ denotes hydrogen or methyl.

5. A compound according to claim 1 corresponding to the formula

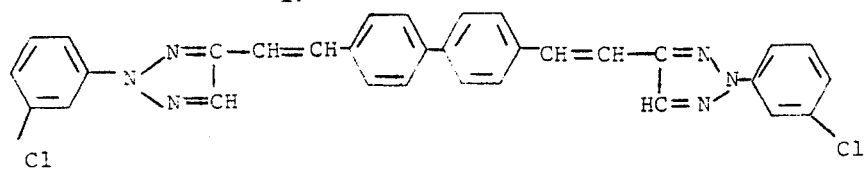
6. A compound according to claim 1 corresponding to the formula
7. A compound according to claim 1 corresponding to the fomula
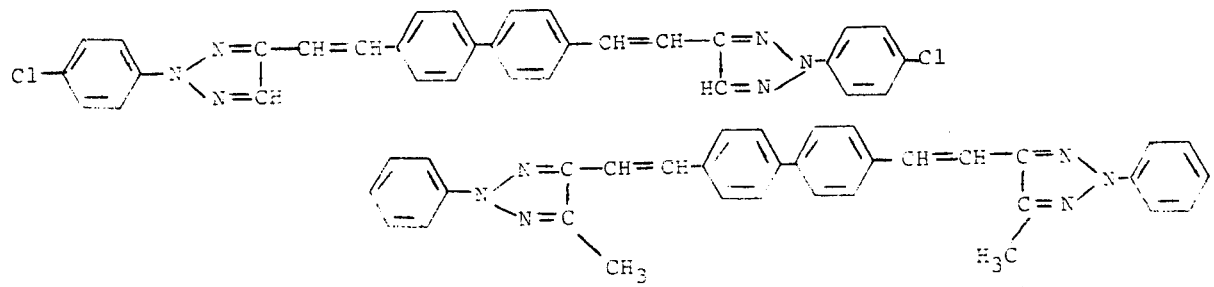
* * * * *